(12) United States Patent
Erlmann

(10) Patent No.: US 6,969,321 B2
(45) Date of Patent: Nov. 29, 2005

(54) FLANGE YOKE

(75) Inventor: Nikolaus Martin Erlmann, Düsseldorf (DE)

(73) Assignee: Spicer Gelenkwellenbau GmbH & Co. KG, Essen (DE)

( * ) Notice: Subject to any disclaimer, the term of this patent is extended or adjusted under 35 U.S.C. 154(b) by 0 days.

(21) Appl. No.: 10/642,473

(22) Filed: Aug. 15, 2003

(65) Prior Publication Data

US 2004/0097291 A1 May 20, 2004

Related U.S. Application Data

(63) Continuation of application No. PCT/EP02/00361, filed on Jan. 16, 2002, now abandoned.

(30) Foreign Application Priority Data

Feb. 16, 2001 (DE) ................................ 101 07 307

(51) Int. Cl.$^7$ ............................................... F16D 3/26
(52) U.S. Cl. ..................................... 464/135; 403/364
(58) Field of Search ............................... 464/134, 135; 403/57, 408.1, 298, 364

(56) References Cited

U.S. PATENT DOCUMENTS

| | | | |
|---|---|---|---|
| 1,660,792 A | * | 2/1928 | Hirth |
| 3,465,546 A | | 9/1969 | Sprya |
| 3,589,142 A | * | 6/1971 | Lecomte ................. 464/135 |
| 4,167,859 A | | 9/1979 | Okuda |
| 4,637,807 A | | 1/1987 | Koelling, Sr. |
| 5,035,676 A | | 7/1991 | Koelling, Sr. |
| 6,056,644 A | | 5/2000 | Lindenthal |

FOREIGN PATENT DOCUMENTS

| | | |
|---|---|---|
| DE | 93 15 717.7 | 2/1994 |
| JP | 03-009118 | 1/1991 |

* cited by examiner

Primary Examiner—Greg Binda
(74) Attorney, Agent, or Firm—MacMillan, Sobanski & Todd, LLC

(57) ABSTRACT

A flange yoke for universal joints includes a first yoke half having a first flange plate and a first bearing portion, a second yoke half having a second flange plate and a second bearing portion, a first end face projecting from the bearing portions, a second end face formed by a first connection face of the first yoke half and a second connection face of the second yoke half, at least one step-like recess on the first yoke half, and at least one step-like projection formed complementary to the recess on the second yoke half. The first yoke half and the second yoke half are detachably connectable to each other by attachment screws. For this, the first yoke half has blind holes with internal threads that extend parallel to a longitudinal axis extending from the first clamping face. For each blind hole, a through bore is arranged in the second yoke half, wherein the attachment screws are passed through the through bores and are received in the blind holes.

14 Claims, 8 Drawing Sheets

FLANGE YOKE

CROSS REFERENCE TO RELATED APPLICATION

This application is a continuation of International Application No. PCT/EP02/00361, filed Jan. 16, 2002, now abandoned, which claims priority from German Patent Application No. 10107307.0, filed Feb. 16, 2001. The disclosures of both applications are incorporated herein by reference.

BACKGROUND OF THE INVENTION

The invention relates to a flange yoke for universal joints, especially for universal joints for the transmission of high torques.

German Patent Application No. 4,313,141 C2 describes a flange yoke for universal joints. The flange yoke is split along a plane that extends along the longitudinal axis and is arranged perpendicularly to a bore axis of the bearing bores by abutment faces in two yoke halves. The abutment faces of the two yoke halves are provided with toothings that are formed complementary to each other and that have teeth that extend perpendicular to the longitudinal axis. On an end face facing away from the bearing bore, the yoke halves have a Hirth-end face serration, with which the yoke halves are separately connectable to a counter-flange. For this, the yoke halves have through bores through which connection screws can be passed. The toothings can only absorb tipping forces. Transversal forces, perpendicular to the longitudinal axis, can, however, lead to displacements of the yoke halves.

European Patent Application No. 206,026 A1 also describes a flange yoke that is split into two yoke halves. The yoke halves have abutment faces that are arranged on a plane extending along a longitudinal axis of the flange yoke and are arranged perpendicular to the respective bore axis of the yoke half. The abutment faces of the two yoke halves have, respectively, grooves formed correspondingly (in a counter-fitting manner) and extending parallel to the longitudinal axis. Respectively, in a groove of the one yoke half and a counter-groove in the other yoke half, a key is inserted that absorbs transversal forces acting perpendicularly to the longitudinal axis. The yoke halves are screwed to each other by means of a screw that extends perpendicular to the longitudinal axis. The flange yoke is connectable to a counter-flange of a shaft by means of connection screws.

German Patent Application No. 2,636,752 A1 describes a universal joint including two joint yokes that are connected to each other by means of a journal cross. The journal cross includes four journals, arranged in pairs on a common journal axis, wherein the journal axes of two pairs intersect each other at a right angle. The joint yokes comprise, respectively, two bearing elements in which, respectively, a bearing bore for the insertion of a journal of the journal cross is provided. The bearing elements of a joint yoke are connected to a mating flange by means of attachment screws. The bearing elements have, for this, respectively, two through bores that extend parallel to a longitudinal axis of the joint yoke. In the mating flange, threaded bores are provided in which the attachment screws passed through the through bores are received. The cross-sectional area of the bearing elements in the plane formed by the journal cross is, because of the through bores, weakened compared to a non-split joint yoke. This results in the maximal transmissible torque being lower. To achieve the same torque capacity as in non-split joint yokes, the bearing elements have to be formed larger, whereby the rotational diameter of the universal joint would be enlarged.

SUMMARY OF THE INVENTION

The object of the present invention is to propose a flange yoke for universal joints enabling, in a split flange yoke design, the highest possible torque and which can be pre-assembled.

The object is solved according to the invention by a flange yoke for a universal joint including a longitudinal axis having a first yoke half and a second yoke half. The first yoke half has a first separation face, with which the first yoke half abuts a second separation face of the second yoke half. The first yoke half has a first flange plate, and the second yoke half has a second flange plate, having a first end face, which is formed by the first flange plate and the second flange plate. The first yoke half has a first bearing portion with a first bearing bore, and the second yoke half has a second bearing portion with a second bearing bore. The bearing portions project, respectively, from the first end face. The first bearing bore and the second bearing bore are arranged on a common bore axis intersecting perpendicularly the longitudinal axis, having a second end face, formed by a first connection face of the first yoke half and by a second connection face of the second yoke half, having at least one step-like recess in the first separation face of the first yoke half, formed starting from the first end face. The recess of the first yoke half is formed by a first support face, extending, starting from the first end face, parallel to the longitudinal axis, a first clamping face, which, starting from the first support face, intersects perpendicularly the longitudinal axis, and a first abutment face, which from the first clamping face continuous into the first connection face and which extends parallel to the longitudinal axis, having at least one step-like projection in the second separation face of the second yoke half, formed complementary to the recess. The projection of the second yoke half in correspondence to the recess is formed by a second support face, a second clamping face and a second abutment face, which, respectively, abut the corresponding face of the first yoke half, wherein the first yoke half and the second yoke half can be detachably connected to each other by means of attachment screws. The first yoke half has blind holes with internal threads or first through bores, extending parallel to the longitudinal axis and starting from the first clamping face, for each blind hole or for each first through bore a second through bore is arranged in the second yoke half, which, starting from the second connection face, merges in the second clamping face, and attachment screws, starting form the second connection face, are passed through the second through bores and rest in the blind holes or wherein attachment screws, starting from the second connection face are passed through the second through bores and the first through bores and rest in threaded members, supported on the first end face of the flange yoke. Thus, it is achieved, that the cross-sections of the first bearing portion and of the second bearing portion in the plane, formed by the journals of the journal cross of a universal joint, are not additionally weakened by bores for attachment screws. Furthermore, no abutment faces on the sides of the bearing portions, arranged distanced from the flange plate, have to be provided. It is prevented, therefore, that screw heads at the end of the bearing portion facing away from the flange plate, collide with components of the other flange yoke of the universal joint at larger bending angles. Furthermore, the flange yoke can be pre-assembled wherein, because of the ability of pre-assembly, tipping forces between the two yoke halves can be absorbed by the clamping faces and the attachment screws and the attachment screws are only loaded tensionwise. To prevent torsional forces in the attachment screws, the attachment screws can be formed as expansion screws. Preferably, the attachment screws have screw ends that are taken up sunk in the second connection face. As additional attachment means, it can be provided, that in the first yoke half blind holes with internal threads are provided that extend parallel to the bore axis and that start from the first separation face, and that for each blind hole, a through bore is arranged in the second yoke half that extends parallel to the bore axis and, starting from an outer circumferential face of the second yoke half, merges in the second separation face, wherein attachments screws are passed through the through bores and rest in the blind holes. Preferably, the first support face and the second support face have means for the transmission of forces in the plane of the support faces. These can be formed in such a way that the first support face and the second support face have, respectively, a toothing as means for the transmission of forces that are formed complementary to each other. The teeth of the toothing of the first support face and the teeth of the toothing of the second support face extend preferably parallel to the longitudinal axis. Other angles in relation to the longitudinal axis are, however, also possible. The first abutment face and the second abutment face can have also means for the transmission of forces, for example, in form of toothings. To be able to transmit forces in the plane of the first clamping face and the second clamping face, these have means for the transmission of forces. These means can be formed in such a way that the first clamping face and the second clamping face have, respectively, a toothing as means for the transmission of forces that are formed complementary to each other. To absorb transversal forces, it can also be provided that in the first connection face, a groove is provided that is aligned with a corresponding groove in the second connection face, and that the grooves extend parallel to the bore axis and that in the grooves, a cotter or crosswise key rests. To center the flange yoke relative to a longitudinal axis of a mating flange, it can be provided that the first connection face and the second connection face have, respectively, means for centering the flange yoke relative to a longitudinal axis of the mating flange. Preferably the centering means is formed as Hirth-end face serration. To connect the flange yoke to a mating flange, blind holes with internal threads are provided, respectively, starting from the first connection face or from the second connection face and extending parallel to the longitudinal axis. The connection screws rest in the blind holes. It can also be provided that, starting from the first connection face and starting from the second connection face, through bores are provided that extend parallel to the longitudinal axis and through which the connection screws can be passed. In this case the connection screws are secured by nuts on the flange yoke.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
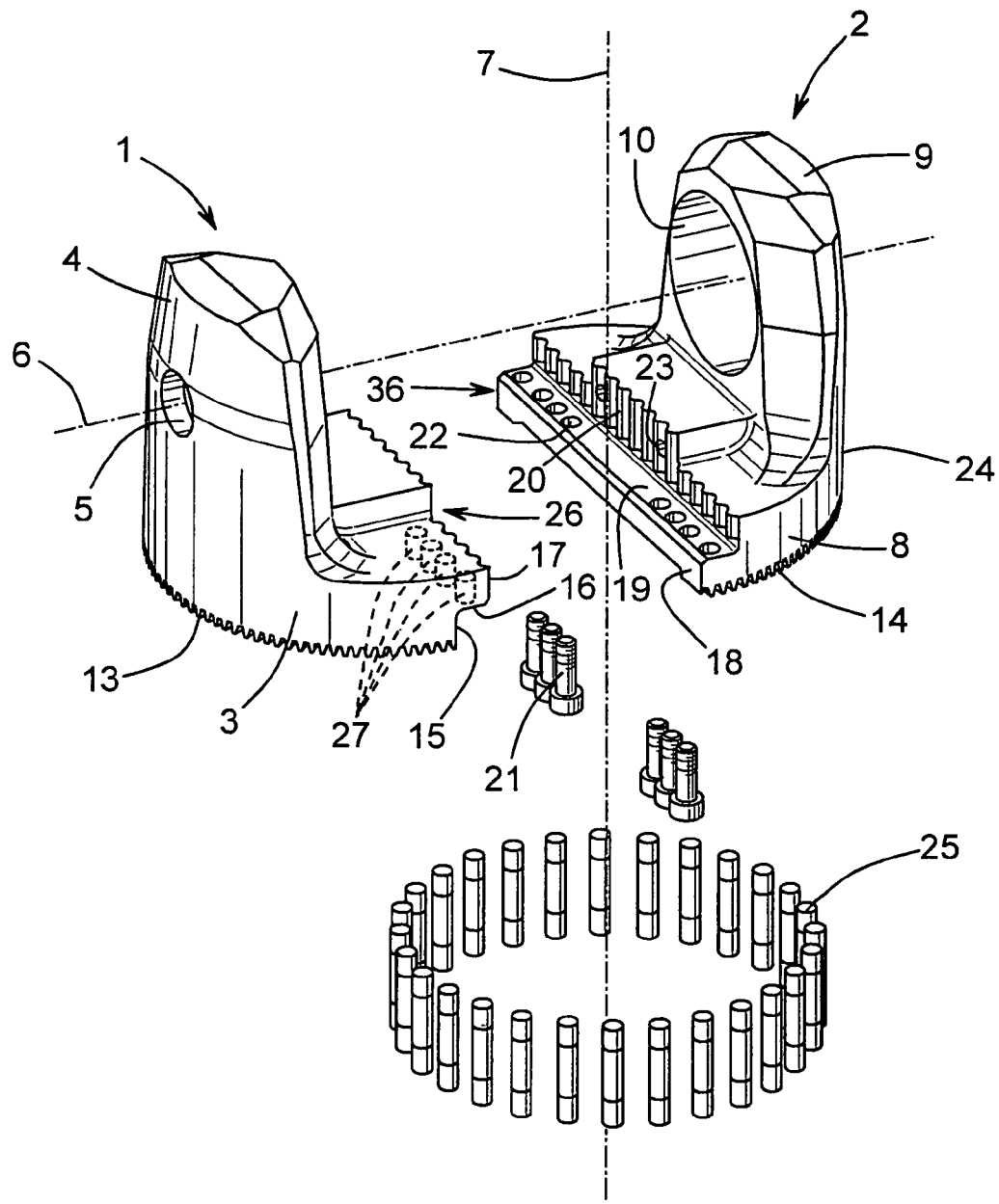
FIG. 1 is an exploded perspective view of a first embodiment of a flange yoke according to the invention with a continuous recess on the first yoke half and a continuous projection on the second yoke half.
Figure 2:
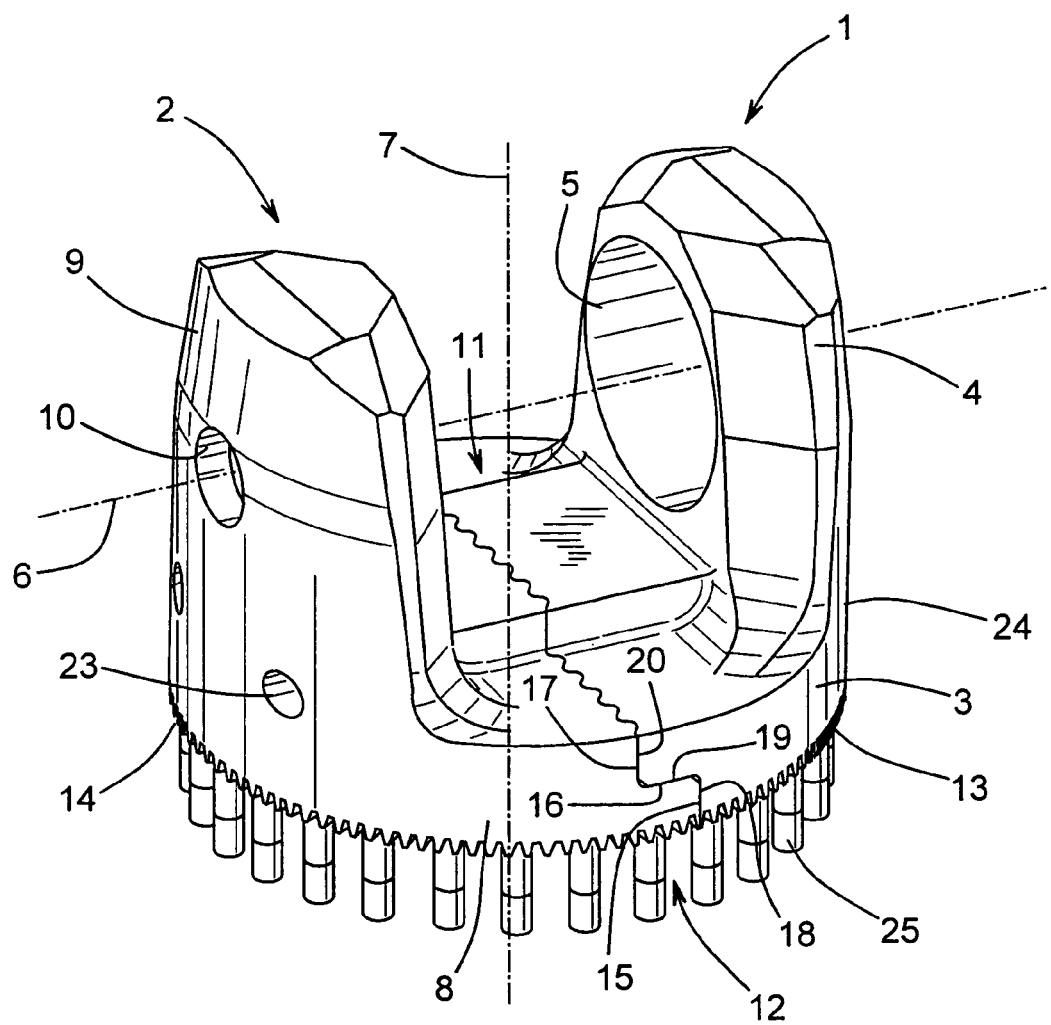
FIG. 2 is a perspective view of the first embodiment of the flange yoke illustrated in FIG. 1 shown assembled.

FIG. 1 shows a first embodiment of a flange yoke in an exploded perspective view, and FIG. 2 shows this flange yoke in the assembled condition in a perspective view. FIGS. 1 and 2 are described together in the following.

The flange yoke includes a first yoke half 1 and a second yoke half 2. The first yoke half 1 has a first flange plate 3 and a first bearing portion 4 that is connected integrally with the first flange plate 1. The first bearing portion 4 has a first bearing bore 5 that is arranged co-axially to a bore axis 6. The bore axis 6 intersects at a right angle a longitudinal axis 7 of the flange yoke.

The second yoke half 2 has a second flange plate 8, as well as a second bearing portion 9, wherein the second bearing portion 9 is formed integrally with the second flange plate 8. In the second bearing portion 9, a second bearing bore 10 is provided that is arranged co-axially to the bore axis 6. The flange yoke has a first end face 11 (see FIG. 2) that is formed by the first flange plate 3 and the second flange plate 8 and from which the first bearing portion 4 and the second bearing portion 9 project. Furthermore, the flange yoke has a second end face 12 (see FIG. 2) that is arranged perpendicularly to the longitudinal axis 7 and is formed by a first connection face 13 and a second connection face 14. The first connection face 13 is arranged on the first flange plate 3, and the second connection face 14 is arranged on the second flange plate 8.

The first yoke half 1 and the second yoke half 2 are detachably connected to each other by means of attachment screws 21. For this, the first yoke half 1 has blind holes 27 with internal threads that extend parallel to the longitudinal axis 7, starting from the first clamping face 16. For each of the first blind holes 27, a second through bore 22 is arranged in the second yoke half 2 that, starting from the second connection face 14, ends in the second clamping face 19. The attachment screws 21 are, starting from the second connection face 14, passed through the second through bores 22 of the second yoke half 2 and are screwed into the blind holes 27 with internal threads of the first yoke half 1. To prevent torsional forces in the attachment screws 21, the attachment screws 21 can be formed as expansion screws.

The attachment screws 21 have screw ends that are countersunk in the second connection face 14.

The second separation face 36 is arranged on the second flange plate 8 of the second yoke half 2 and has a step-like projection that is formed correspondingly to the step-like recess of the first flange plate 3. The projection is formed by a second abutment face 18, a second clamping face 19, and a second support face 20. The second abutment face 18 starts from the second connection face 14 and extends parallel to the longitudinal axis 7. The second clamping face 19 starts from the second abutment face 18 and is arranged perpendicularly to the longitudinal axis 7. The second clamping face 19 merges into the second support face 20, which extends parallel to the longitudinal axis 7.

In the assembled condition of the first yoke half 1 and the second yoke half 2, the first abutment face 15 and the second abutment face 18, the first clamping face 16 and the second clamping face 19, and the first support face 17 and the second support face 20 abut each other, respectively. In this case, the first support face 17 and the second support face 20 have respective toothings, wherein the toothing of the first support face 17 is formed complementary to the toothing of the second support face 20. The teeth of the toothings extend parallel to the longitudinal axis 7.

The first yoke half 1 and the second yoke half 2 are detachably connected to each other by means of attachment screws 21. For this, the first yoke half 1 has blind holes (not shown) with internal threads that extend parallel to the longitudinal axis 7, starting from the first clamping face 16. For each of the first blind holes, a second through bore 22 is arranged in the second yoke half 2 that, starting from the second connection face 14, ends in the second clamping face 19. The attachment screws 21 are, starting from the second connection face 14, passed through the second through bores 22 of the second yoke half 2 and are screwed into the blind holes with internal threads of the first yoke half 1.

Furthermore, for the tensioning of the first yoke half 1 to the second yoke half 2, through bores 23 are provided in the second yoke half 2 that, starting from an outer circumferential face 24, end in the second support face 20 and intersect the longitudinal axis 7 with distance thereto. For each through bore 23 in the second yoke half 2, a blind hole (not shown) with an internal thread is arranged in the first yoke half 1. The blind holes start from the first support face 17 and extend as extensions of the through bores 23. Attachment screws (not shown in FIG. 1, but similar to those shown at 127 in FIG. 3) are, starting from the outer circumferential face 24, passed through the through bores 23 of the second yoke half 2 and are screwed into the blind holes with internal threads of the first yoke half 1.

To connect the flange yoke assembly of the first yoke half 1 and the second yoke half 2 to a mating flange, in the first connection face 13 and the second connection face 14, blind holes (not shown) with internal threads are provided. Such blind holes extend parallel to the longitudinal axis 7 and are equally distributed on a circumference around the longitudinal axis 7. Into the blind holes with internal threads, connection screws 25 in form of stud screws are screwed. The screwed-in connection screws 25 project over the second end face 12 of the flange yoke and can be passed through bores of a mating flange and can be secured by means of nuts. To be able to center the flange yoke relative to a longitudinal axis of the mating flange and to provide means for the torque transmission, the second end face 12 is provided with a Hirth-end face serration, which can be engaged in a complementary Hirth-end face serration of the mating flange.

Figure 3:
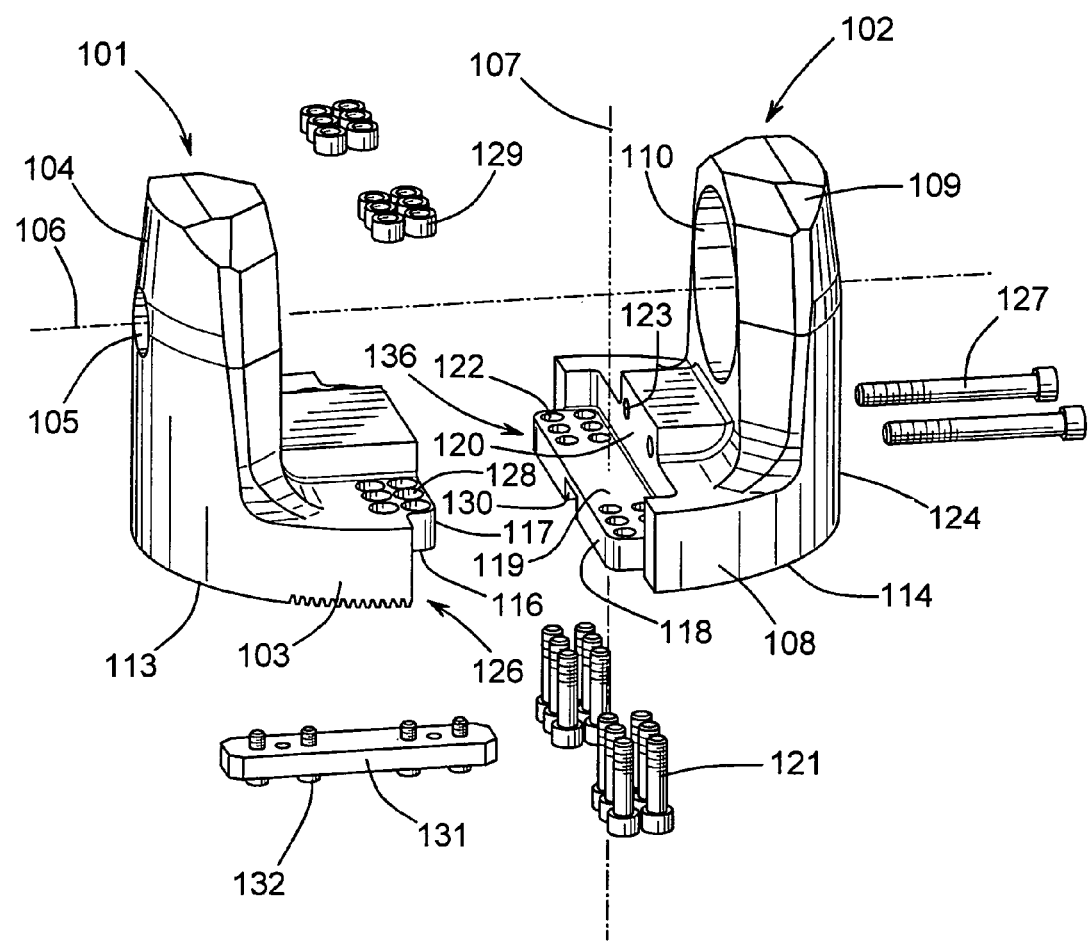
FIG. 3 is an exploded perspective view of a second embodiment of a flange yoke according to the invention, wherein the recess and the projection do not extend over the complete diameter of the flange yoke.

FIG. 3 shows a second embodiment of a flange yoke with a first yoke half 101 and a second yoke half 102 in an exploded view. The components that correspond to the components of FIGS. 1 and 2 are provided with reference numerals that are increased by the value 100 and are as described in conjunction with FIGS. 1 and 2.

The recess in the first separation face 126 of the first yoke half 101 and the projection in the second separation face 136 of the second yoke half 102 do extend in radial direction, but not up to the outer circumferential face 124. They only reach up to respective areas of the separation faces 126, 136 that start from the outer circumferential face 124 and are arranged on a plane that is arranged perpendicular to the bore axis 106 and extend along the longitudinal axis 107.

Represented in FIG. 3 are attachment screws 127 that are passed through the through bores 123 of the second yoke half 102 and can be screwed into the blind holes with internal threads in the first yoke half 101.

In the first yoke half 101, first through bores 128 are provided. The attachment screws 121 are, starting from the second connection face 114, passed through the second through bores 122 of the second yoke half 102 and through the first through bores 128 of the first yoke half 101 and are secured by means of nuts 129.

In the second end face 112, a groove 130 is provided, in which a crosswise key or cotter 131 rests. The groove 130 extends parallel to the bore axis 106. The crosswise key 131 is fixed by screws 132 in the groove 130.

Figure 4:
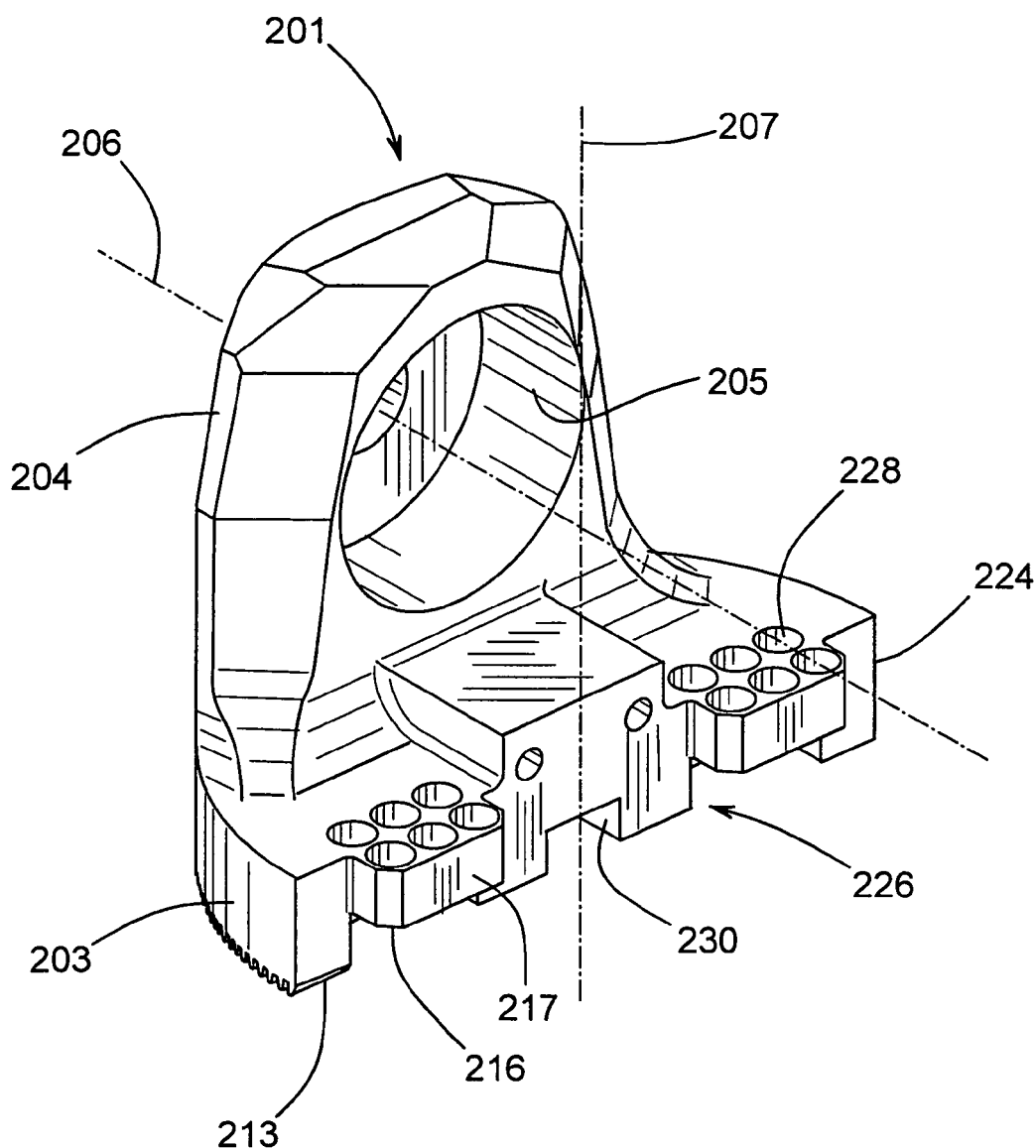
FIG. 4 is an exploded perspective view of a first yoke half for a third embodiment of a flange yoke according to the invention having two recesses.
Figure 5:
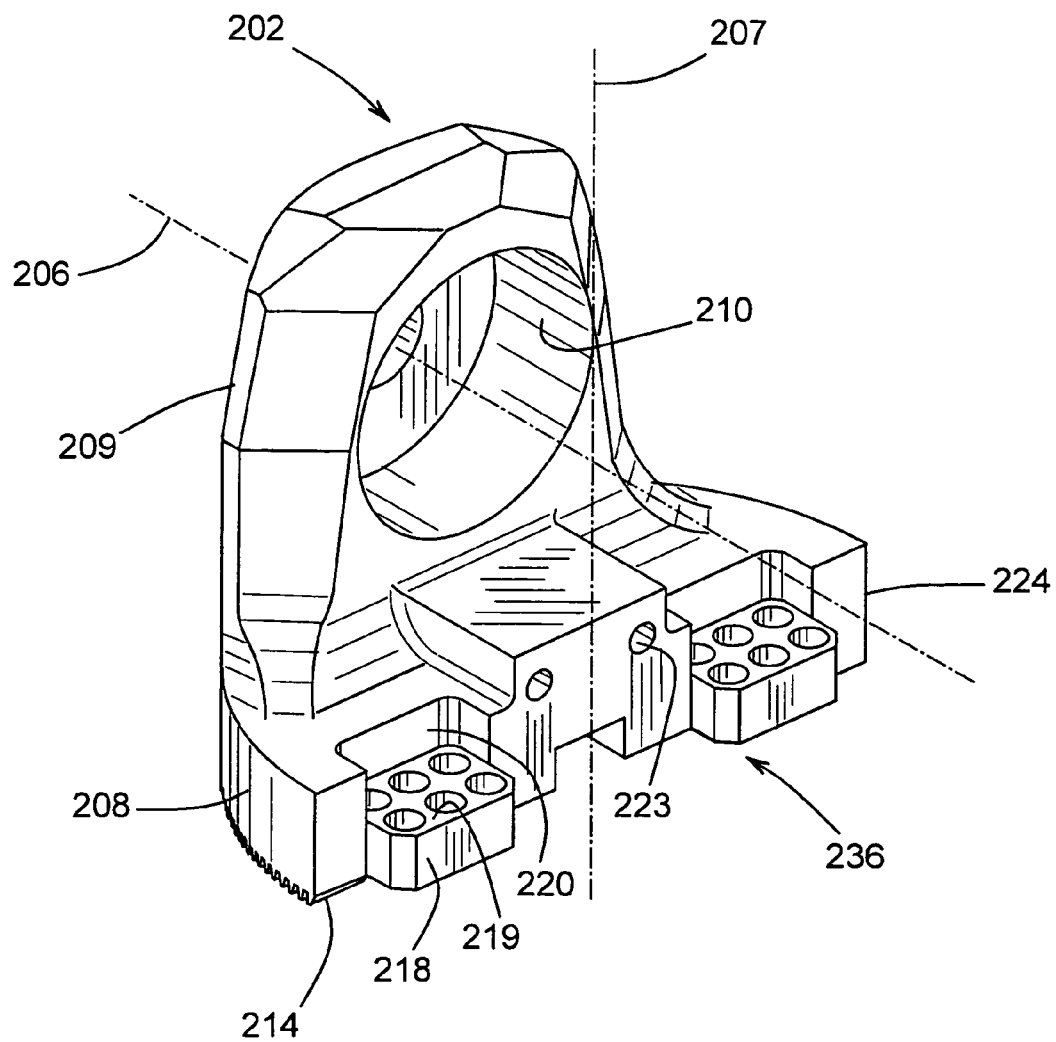
FIG. 5 is an exploded perspective view of a second yoke half for a third embodiment of a flange yoke according to the invention having two projections.

FIG. 4 shows a first yoke half 201, and FIG. 5 shows a second yoke half 202 of a third embodiment of a flange yoke. The components that correspond to the components of FIGS. 1 and 2 are provided with reference numerals that are increased by the value 200 and are as described in conjunction with FIGS. 1 and 2. The components that correspond to components of FIG. 3 are provided with reference numerals that are increased by the value 100 and are as described in conjunction with FIG. 3. In the following, FIGS. 4 and 5 are described together.

The first separation face 226 of the first yoke half 201 has two recesses that extend in the radial direction over a partial area of the diameter of the flange yoke. The second separation face 236 of the second yoke half 202 has corresponding projections that also extend in the radial direction, but only over a partial area of the diameter of the flange yoke.

Figure 6:
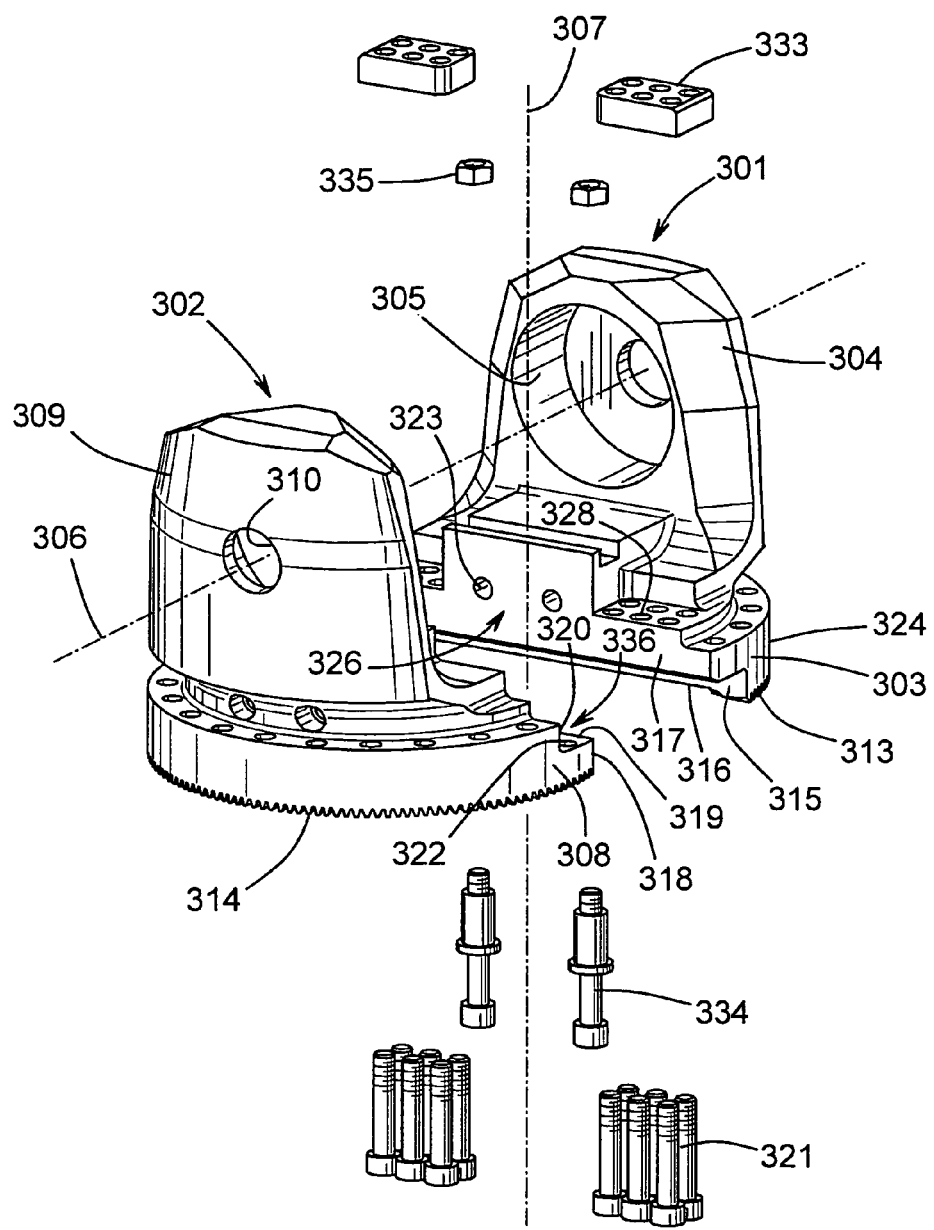
FIG. 6 is an exploded perspective view of fourth embodiment of a flange yoke according to the invention, wherein the first yoke half has a continuous recess and the second yoke half has a continuous projection with pressure plates serving as nuts for attachment screws.
Figure 7:
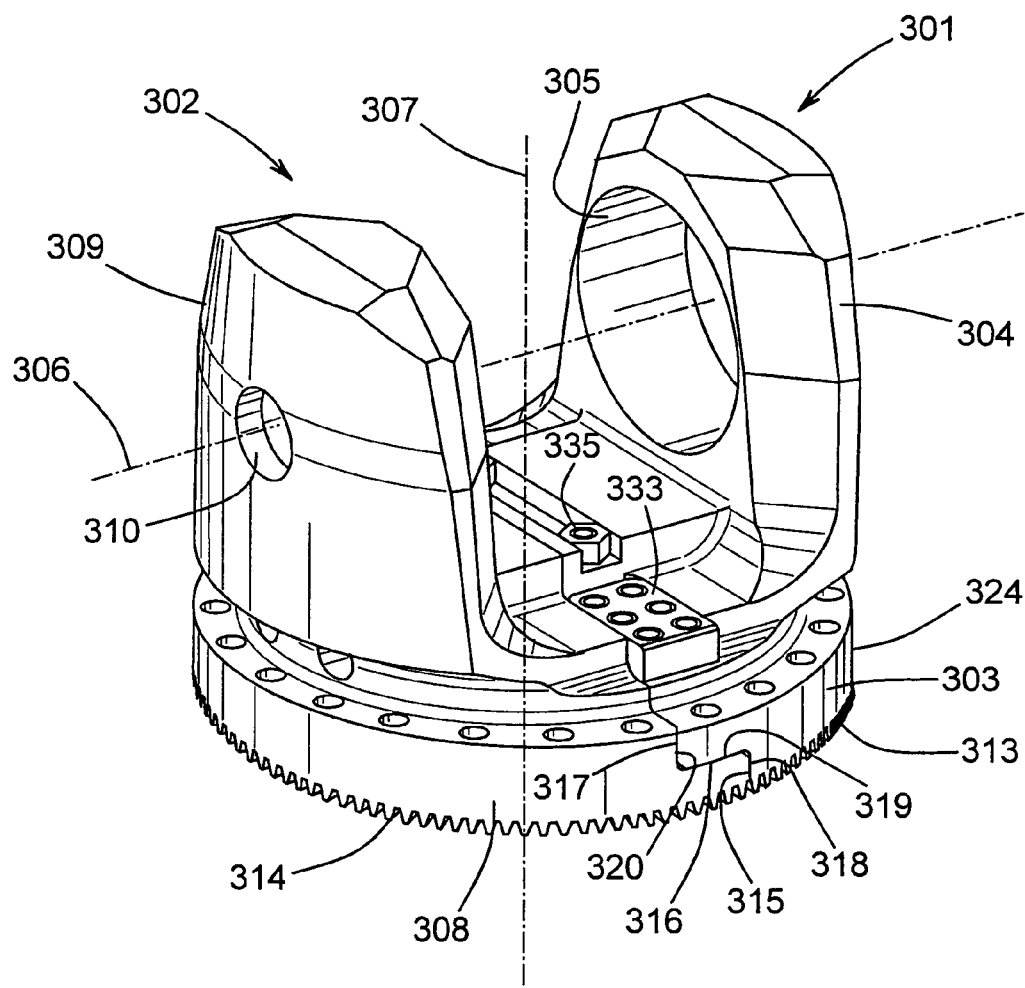
FIG. 7 is a perspective view of the fourth embodiment of the flange yoke illustrated in FIG. 6 shown assembled.

FIGS. 6 and 7 show a fourth embodiment of a flange yoke of FIGS. 1 and 2. Corresponding components are provided with reference numerals that are increased by the value 300, and are as described in conjunction with FIGS. 1 and 2.

The first yoke half 301 has, instead of the blind holes with internal threads, first through bores 328. The attachment screws 321 are, starting from the second connection face 314 of the second yoke half 302, passed through the second through bores 322 as well as the first through bores 328 of the first yoke half 301 and are screwed into internal threads of pressure plates 333. Two pressure plates 333 for respectively six attachment screws 321 are provided. The pressure plates 333 are supported on the first end face 311 of the flange yoke. Further attachment screws 334 are passed through bores (not shown) of the second yoke half 302 and through bores (not shown) of the first yoke half 301 and are secured by nuts 335.

The advantage of the embodiment with pressure plates 333 is that with corroded attachment screws 321, the heads of the attachment screws 321 can be removed with a flame cutter. Then, the pressure plates 333 loosely abut the first end face 311 of the flange yoke and can be removed together with the attachment screws 321.

Figure 8:
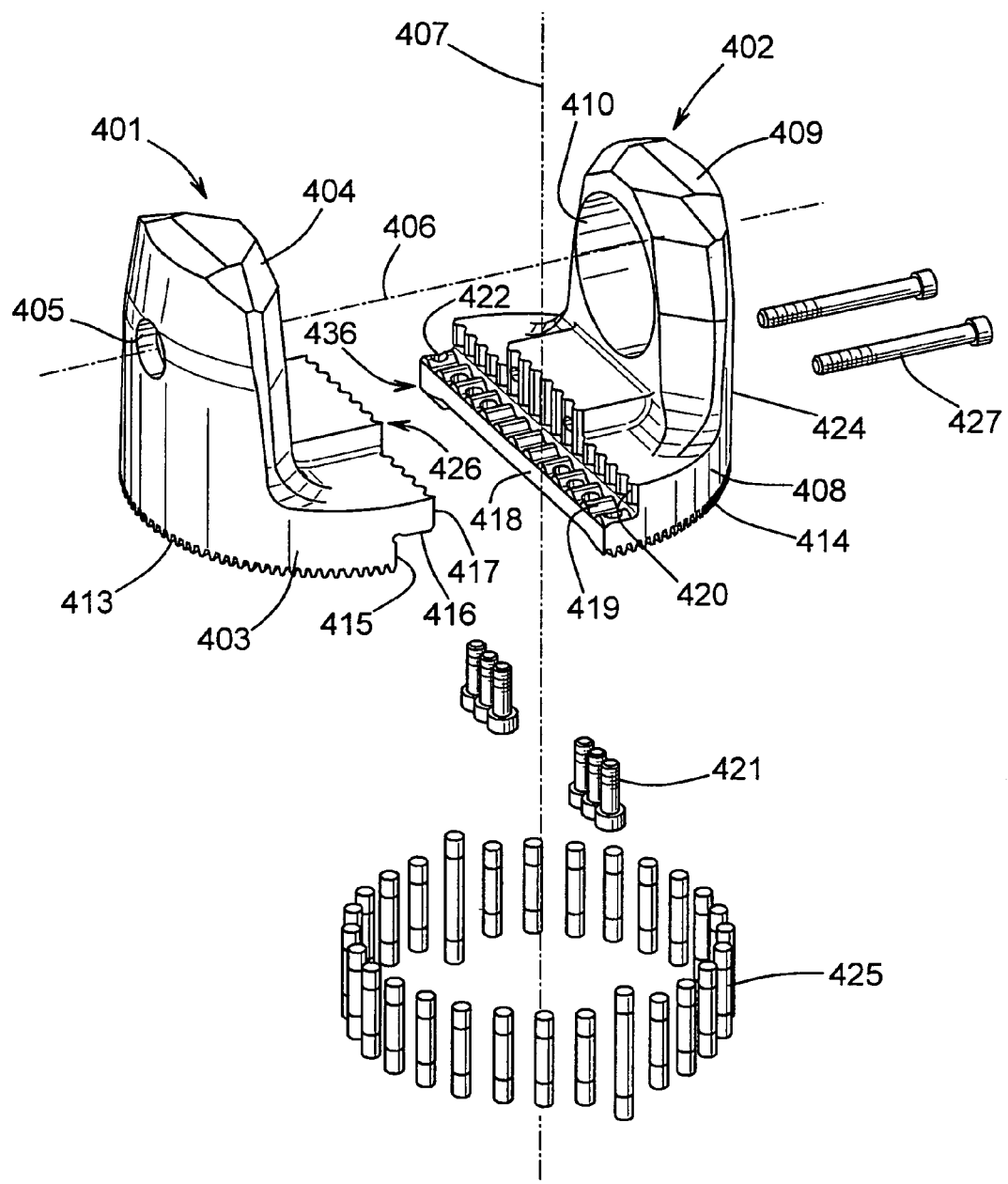
FIG. 8 is an exploded perspective view of fifth embodiment of a flange yoke according to the invention, wherein the first clamping face and the second clamping face have respective toothings.

FIG. 8 shows a fifth embodiment of a flange yoke similar to FIG. 1, wherein corresponding components are provided with reference numerals that are increased by the value 400 and are as described in conjunction with FIG. 1.

To be able to transmit forces in the plane of the first clamping face 416 and the second clamping face 419, the first clamping face 416 has a longitudinal toothing that is formed complementary to a longitudinal toothing of the second clamping face 419. These toothings can be provided in combination, as shown, with toothings on the first end face 417 and the second support face 420. The first abutment face 415 and the second abutment face 48 can also have toothings for the transmission of transversal forces.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A flange yoke for a universal joint comprising:
   a first yoke half and a second yoke half, wherein the first yoke half has a first separation face that abuts a second separation face of the second yoke half, and wherein
   the first yoke half has a first flange plate and the second yoke half has a second flange plate, and the flange yoke has a first end face that is formed by the first flange plate and the second flange plate, and wherein
   the first yoke half has a first bearing portion with a first bearing bore, and the second yoke half has a second bearing portion with a second bearing bore, the bearing portions projecting, respectively, from the first end face of the flange yoke, and the first bearing bore and the second bearing bore being arranged on a common bore axis that perpendicularly intersects a longitudinal axis defined by the flange yoke, and wherein
   the flange yoke has a second end face that is formed by a first connection face of the first yoke half and by a second connection face of the second yoke half, and wherein
   at least one step-like recess is formed in the first separation face of the first yoke half, wherein the recess of the first yoke half is formed by a first support face that starts from the first end face and extends parallel to the longitudinal axis, a first clamping face that extends from the first support face and intersects perpendicularly the longitudinal axis, and a first abutment face that extends from the first clamping face continuous into the first connection face and parallel to the longitudinal axis, and wherein
   at least one step-like projection is formed in the second separation face of the second yoke half that is complementary to the recess, wherein the projection of the second yoke half is formed by a second support face, a second clamping face, and a second abutment face that respectively abut the corresponding faces of the first yoke half, and wherein
   the first yoke half and the second yoke half are detachably connected to each other by means of attachment screws, wherein the first yoke half has blind holes with internal threads or first through bores that extend parallel to the longitudinal axis and start from the first clamping face, and wherein for each blind hole or for each first through bore, a second through bore is arranged in the second yoke half that, starting from the second connection face, merges in the second clamping face, and wherein the attachment screws, starting from the second connection face, are passed through the second through bores and rest in the blind holes or wherein the attachment screws, starting from the second connection face, are passed through the second through bores and the first through bores and rest in threaded members that are supported on the first end face of the flange yoke.

2. A flange yoke according to claim 1, characterized in that the attachment screws are formed as expansion screws.

3. A flange yoke according to claim 1, characterized in that the attachment screws have screw ends that are countersunk in the second connection face.

4. A flange yoke according to claim 1, characterized in that in the first yoke, half blind holes with internal threads are provided that extend parallel to the bore axis and that start from the first separation face, and that for each blind hole, a through bore is arranged in the second yoke half that extends parallel to the bore axis and, starting from an outer circumferential face of the second yoke half, merges in the second separation face, wherein attachments screws are passed through the through bores and rest in the blind holes.

5. A flange yoke according to claim 1, characterized in that the first support face and the second support face have means for the transmission of forces in the plane of the support faces.

6. A flange yoke according to claim 5, characterized in that the first support face and the second support face have, respectively, a toothing as means for the transmission of forces, which are formed complementary to each other.

7. A flange yoke according to claim 6, characterized in that teeth of the toothing of the first support face and teeth of the toothing of the second support face extend parallel to the longitudinal axis.

8. A flange yoke according to claim 1, characterized in that the first clamping face and the second clamping face have means for the transmission of forces in the plane of the clamping faces.

9. A flange yoke according to claim 8, characterized in that the first clamping face and the second clamping face have, respectively, a toothing as means for the transmission of forces, which are formed complementary to each other.

10. A flange yoke according to claim 1, characterized in that a groove is provided in the first connection face that is aligned with a corresponding groove in the second connection face, that the grooves extend parallel to the bore axis, and that in the grooves, a cotter or crosswise key rests.

11. A flange yoke according to claim 1, characterized in that the first connection face and the second connection face have, respectively, means for centering the flange yoke relative to a longitudinal axis of a mating flange.

12. A flange yoke according to claim 11, characterized in that the means for centering is formed by Hirth-end face serration.

13. A flange yoke according to claim 1, characterized in that, starting from the first connection face and starting from the second connection face, blind holes with internal threads are provided that extend parallel to the longitudinal axis and into which connection screws can be inserted.

14. A flange yoke according to claim 1 characterized in that, starting from the first connection face and starting from the second connection face, through bores are provided that extend parallel to the longitudinal axis and through which connection screws can be passed.

* * * * *

UNITED STATES PATENT AND TRADEMARK OFFICE
CERTIFICATE OF CORRECTION

PATENT NO. : 6,969,321 B2
DATED : November 29, 2005
INVENTOR(S) : Nikolaus Martin Erlmann It is certified that error appears in the above-identified patent and that said Letters Patent is hereby corrected as shown below:

Column 4,
Line 54, should read -- The first yoke half 1 has a first separation face 26 that, in the assembled condition of the flange yoke, abuts a second separation face 36 of the second yoke half 2. The first separation face 26 is arranged on the flange plate 3 of the first yoke half 1 and has a step-like recess that, starting from the first connection face 13, is formed by a first abutment face 15, a first clamping face 16, and a first support face 17. The first abutment face 15 starts from the first connection face 13 and extends parallel to the longitudinal axis 7. The first abutment face 15 merges into the first clamping face 16, intersecting perpendicularly the longitudinal axis 7 in the assembled condition of the two yoke halves 1, 2. The first clamping face 16 merges into the first support face 17, extending parallel to the longitudinal axis 7, and merges into the first end face 11 of the flange yoke. The recess extends in radial direction over the complete diameter of the first flange plate 3 in this embodiment of the invention. --.

Column 5,
Line 25, should read -- The first yoke half 1 and the second yoke half 2 are detachably connected to each other by means of attachment screws 21. For this, the first yoke half 1 has blind holes 27 with internal threads that extend parallel to the longitudinal axis 7, starting from the first clamping face 16. For each of the first blind holes 27, a second through bore 22 is arranged in the second yoke half 2 that, starting from the second connection face 14, ends in the second clamping face 19. The attachment screws 21 are, starting from the second connection face 14, passed through the second through bores 22 of the second yoke half 2 and are screwed into the blind holes 27 with internal threads of the first yoke half 1. To prevent torsional forces in the attachment screws 21, the attachment screws 21 can be formed as expansion screws. The attachment screws 21 have screw ends that are countersunk in the second connection face 14. --.

Signed and Sealed this

Twenty-first Day of March, 2006

JON W. DUDAS
*Director of the United States Patent and Trademark Office*